Jan. 13, 1953  E. W. CROWLEY  2,625,410
COUPLING

Filed May 7, 1949  2 SHEETS—SHEET 1

INVENTOR.
E. W. CROWLEY
BY
William R. Lane
ATTORNEY

Jan. 13, 1953  E. W. CROWLEY  2,625,410
COUPLING

Filed May 7, 1949  2 SHEETS—SHEET 2

INVENTOR.
E. W. CROWLEY
BY
William R. Lane
ATTORNEY

Patented Jan. 13, 1953

2,625,410

UNITED STATES PATENT OFFICE 2,625,410

COUPLING

Ernest W. Crowley, Santa Monica, Calif., assignor to North American Aviation, Inc.

Application May 7, 1949, Serial No. 91,970

5 Claims. (Cl. 284—18)

This invention pertains to the conducting of fluid through a disconnectible conduit. It particularly pertains to the disconnecting of fluid conduits without appreciable loss of the fluid contained in the conduits.

In the handling of inflammable fluids there has always existed the problem of disconnecting the fluid lines and connecting them rapidly without loss of the fluid. This problem has been particularly acute in the rapid refueling of aircraft and is even more acute in connection with guided missiles. Whenever a high pressure or inflammable fluid is conducted from a storage facility to a transportation vehicle at least that amount of fluid which is contained in the conduit lines has been lost each time the flow was interrupted. Furthermore, if separate valves were provided at the points of breaking of the conduits, several manual operations were necessary to close the valves and disengage the conduits.

It is therefore an object of this invention to provide a quick-disconnect coupling for fluid conduits.

It is a further object of this invention to provide a connect-disconnect coupling for fluid conduits which close the two separate parts of the conduit to eliminate loss of fluid.

It is a further object of this invention to provide a positive action fluid lock in a quick-disconnect coupling which is incapable of disengagement when the coupling is disconnected.

It is a further object of this invention to provide a valve in combination with a coupling which coupling cannot be uncoupled when said valve is in open position and which valve cannot be opened when said coupling is in uncoupled position.

Other objects of invention will become apparent from the following description taken in connection with the accompanying drawings in which.

Figure 3:
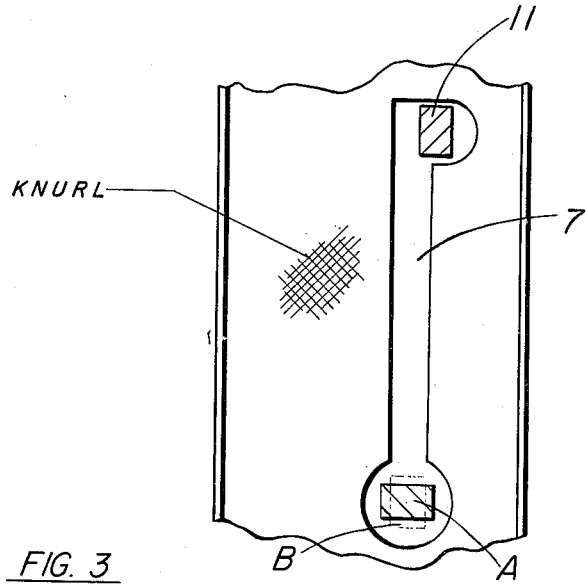

And Fig. 3 is a flat pattern development of the cam shaft lock of this invention.

Figure 1:
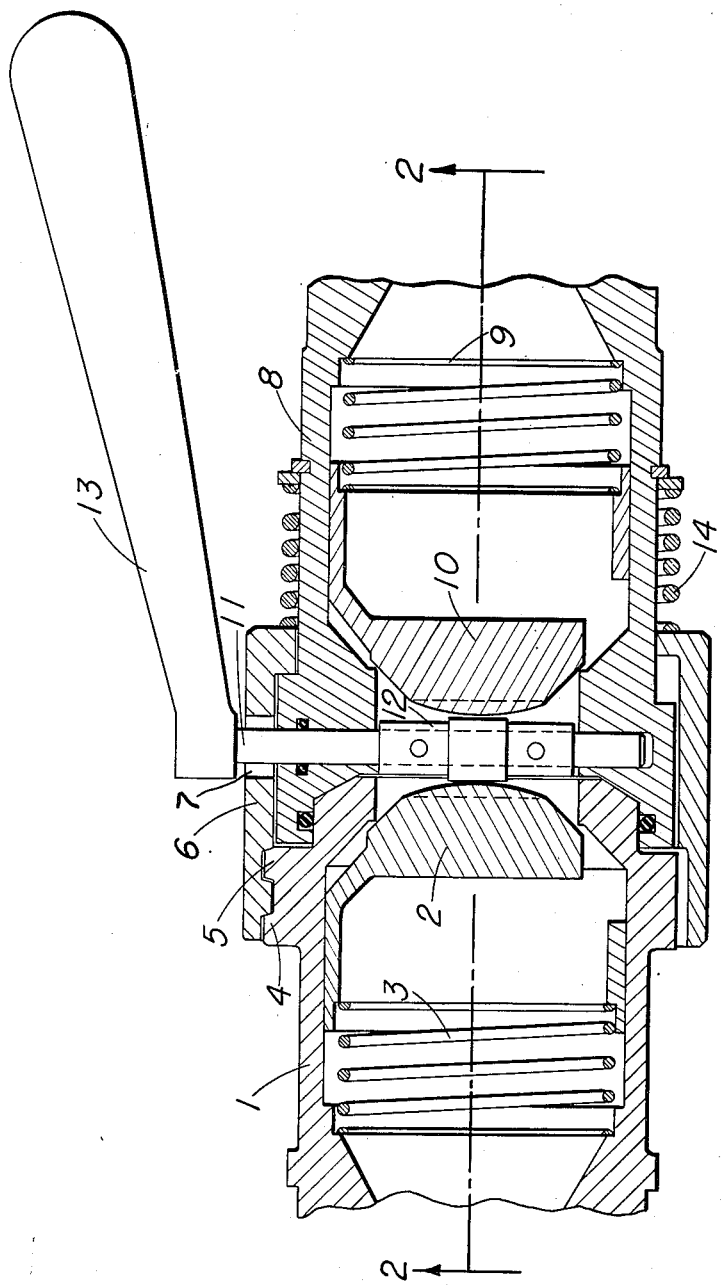
Fig. 1 is an elevational view of the invention partly in section.

Referring now to Fig. 1, there is shown coupling member 1 containing poppet 2, compression spring 3, and having stub threads 4 and 5 of the breech block type which engage union nut 6 having a knurled surface as shown in Fig. 3 and cam shaft lock slot 7. Coupling member 8 contains spring 9 and poppet 10 and serves as a support and pivot means for cam shaft 11, having a cam 12 and a handle 13. Spring 14 acts on union nut 6 in compression as shown in Fig. 1.

Figure 2:
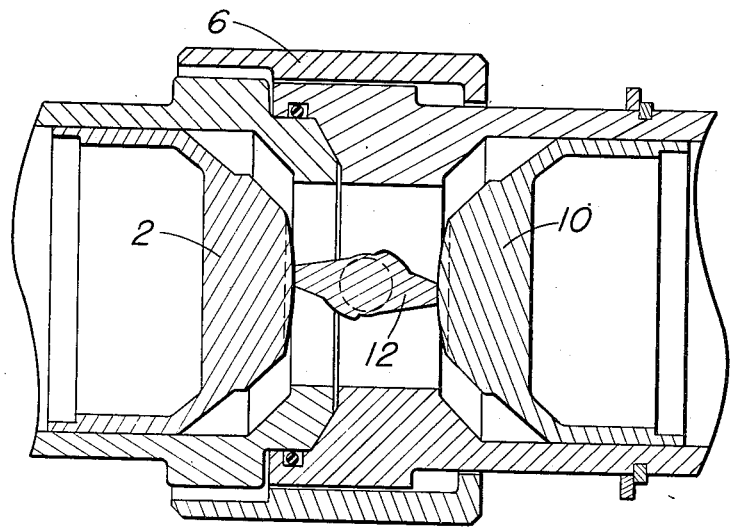
Fig. 2 is a sectional view of the device shown in Fig. 1 taken at 2—2 in Fig. 1.

Fig. 2 shows poppets 2 and 10 in open position in response to actuation by cam 12.

In Fig. 3 cam shaft 11 is shown in cross-section to indicate its relationship with cam shaft lock 7. Cam shaft 11 is rectangular in cross-section at the point where it passes through union nut 6, and its width is equal to the width of the slot in union nut 6 which forms cam shaft lock 7.

Assuming that it is desired to uncouple a coupled conduit in which fluid is flowing, handle 13 would be found in position A in Fig. 3. This position is illustrated in Fig. 2, which shows poppets 2 and 10 separated by action of cam 12. When it is desired to close the valve, handle 13 is rotated 90° bringing cam shaft 11 to position B in Fig. 3. Cam shaft 11 then presents its narrow dimension to lock slot 7 and union nut 6 can be turned throughout the distance represented by the length of lock slot 7. Observe also that poppets 2 and 10 are now in closed position as shown in Fig. 1 and fluid cannot flow from either half of the coupling into the area occupied by cam 12.

Union nut 6 is now free to rotate and may be rotated to disengaged position thus allowing the separation of the two halves of the coupling. When the union nut is in disengaged position it is held there either by friction with spring 14 or by a detent (not shown) so that it may be readily recoupled. Since the stub threads on union 6 are relatively short, this operation is very rapid and lock slot 7 positively prevents the opening of poppets 2 and 10 during disengagement of union member 6. After such disengagement poppet 10 then may be opened by turning cam 12 in the enlarged end portion of lock slot 7. If desired, this enlargement in lock slot 7 may be omitted. It is then impossible to open either side of the conduit when the union nut is disengaged. It is likewise impossible, due to the configuration of lock slot 7, to disengage union nut 6 when poppets 2 and 10 are in open position to allow the flow of fluid. Dangerous fluids such as gasoline may therefore be handled in flexible or temporary conduits without danger of spilling the fluid. The coupling may be connected and disconnected with a minimum of time and effort and its positive mode of operation assures foolproof performance.

Although the invention has been described and illustrated in detail, it is to be clearly understood that the same is by way of illustration and example only and is not to be taken by way of limitation, the spirit and scope of this inven-

I claim:

1. Quick disconnect coupling means comprising two conduit members to be joined one of which has stub threads and the other of which carries a union member and a cam shaft transverse of the flow of fluid in said conduits, said cam shaft having a rectangular cross-section where it passes through said union member, said annular union member carried by one of said conduit members, threaded to engage said stub threads, and having a peripheral slot of width larger than the width of said cam shaft cross-section and having enlarged areas in at least one end of said slot, two spring seated poppet valves in said conduit members and cam means on said cam shaft adapted to open or close said valves when said union member is engaged and only to close said valves when said union member is partially or wholly disengaged.

2. In a quick disconnect coupling for fluid conduits in which the ends of said conduits to be connected are equipped with self-closing poppet valves, the combination comprising a cam shaft pivotally mounted on one of said conduits transverse to the longitudinal axis of said conduits, outside of said poppet valves and protruding from said conduits at least at one point, said cam shaft having a rectangular cross-section in the portion extending from said conduit, union means having breech block threads adapted to connect said conduits in less than one-half revolution and having a transverse slot receiving the narrow dimension of said rectangular cam shaft section and with enlarged end portions, and a cam on said shaft adapted to open said poppet valves when said cam shaft is turned, whereby said valves may be opened only when said union member is completely engaged and said union member may be disengaged only when said valves are closed.

3. A safety coupling for connecting fluid conduits comprising two conduit members having poppet valves seated by forces within the conduits and adapted to be unseated by forces opposed to fluid pressure within said conduits, one said conduit member characterized by having a pivot bracket extending beyond said poppet valves and the other of said conduit members characterized by having male breech block type threads; a cam and cam shaft pivotable in said bracket, extending beyond said conduit members transversely, and having a rectangular cross-section externally of said conduit member, said cam being adapted to open said poppet valves when said cam shaft is turned and a union member having a female breech block thread and fitted on said first named conduit member while threadingly engaging said second named conduit member, said union member being slotted transversely to receive the rectangular portion of said cam shaft with the ends of said slot enlarged whereby said cam shaft cannot be turned to open said poppet valves when said union member is partly or wholly disengaged and said union member cannot be disengaged when said cam shaft is in the position required for said poppet valves to be open.

4. Fluid conduit coupling means comprising two conduit members to be coupled, one said conduit member having male thread means thereon, spring seated valve means fitted in the ends of said members and adapted to be opened by force applied in opposition to fluid pressure within the conduits, cam means disposed transversely of said conduit and rotatably supported in one of said conduit members adjacent to said valve means and shaped to apply a force when turned in a direction to open said valve means, union means having female thread means upon one end thereof, between said conduit means, attaching said conduit means together by the engagement of said male and female thread means, in fluid tight conjunction, said union means having a terminally enlarged circumferential slot therein, and a crank attached to said cam means having a rectangular cross section slidingly engaging said slot and passing therethrough whereby said valves are opened only when said union member is completely engaged and said union member is disengaged only when said valves are closed.

5. A device as recited in claim 4 in which the rectangular cross section of said crank is longer than it is wide at its intersection with said union, the narrow portion of said crank being turned to engage said slot when said valve means are closed to thereby prevent opening of said valve means when said union is disengaged and to prevent disengagement of said union when said valve means are open.

ERNEST W. CROWLEY.

REFERENCES CITED

The following references are of record in the file of this patent:

UNITED STATES PATENTS

| Number | Name | Date |
|---|---|---|
| 687,253 | Morgan | Nov. 26, 1901 |